(12) United States Patent
Wilson

(10) Patent No.: US 10,867,310 B2
(45) Date of Patent: Dec. 15, 2020

(54) SYSTEMS AND METHODS FOR DETERMINING SEGMENTS OF ONLINE USERS FROM CORRELATED DATASETS

(71) Applicant: AOL Inc., Dulles, VA (US)

(72) Inventor: Jeffrey Todd Wilson, Ashburn, VA (US)

(73) Assignee: Oath Inc., Dulles, VA (US)

( * ) Notice: Subject to any disclaimer, the term of this patent is extended or adjusted under 35 U.S.C. 154(b) by 824 days.

(21) Appl. No.: 14/541,321

(22) Filed: Nov. 14, 2014

(65) Prior Publication Data

US 2016/0140587 A1 May 19, 2016

(51) Int. Cl.
| | |
|---|---|
| *G06Q 30/02* | (2012.01) |
| *G06F 16/22* | (2019.01) |
| *G06F 16/27* | (2019.01) |
| *G06F 12/14* | (2006.01) |

(52) U.S. Cl.
CPC ..... *G06Q 30/0204* (2013.01); *G06F 12/1408* (2013.01); *G06F 16/2291* (2019.01); *G06F 16/27* (2019.01); *G06Q 30/0269* (2013.01)

(58) Field of Classification Search
CPC .................. G06Q 30/0204; G06Q 30/0201
USPC ....................................................... 705/7.33
See application file for complete search history.

(56) References Cited

U.S. PATENT DOCUMENTS

| | | | | |
|---|---|---|---|---|
| 7,424,439 | B1 * | 9/2008 | Fayyad | G06Q 30/0204 705/7.33 |
| 2007/0239518 | A1 * | 10/2007 | Chung | G06Q 30/02 707/758 |
| 2008/0181225 | A1 | 7/2008 | Zampiello | |
| 2011/0138191 | A1 * | 6/2011 | Bond | G06F 21/32 713/189 |
| 2012/0290950 | A1 * | 11/2012 | Rapaport | H04L 51/32 715/753 |
| 2014/0108139 | A1 * | 4/2014 | Weinstein | G06Q 30/02 705/14.53 |

OTHER PUBLICATIONS

Uda (R. Uda, "Privacy Obfuscation with Bloom Filter for Effective Advertisement," 2013 27th International Conference on Advanced Information Networking and Applications Workshops, Barcelona, 2013, pp. 941-946, Date: Jul. 1, 2013).*

International Search Report and Written Opinion issued in corresponding International Application No. PCT/US2015/056303, dated Jan. 14, 2016 (8 pages).

* cited by examiner

*Primary Examiner* — Matthew D Henry
(74) *Attorney, Agent, or Firm* — Bookoff McAndrews, PLLC

(57) ABSTRACT

Systems and methods are disclosed for determining segments of online users from a correlated dataset. One method includes receiving, over a network, a plurality of datasets including user-related data of a plurality of users, each dataset being transmitted from a data owner; correlating, by at least one processor, the plurality of datasets into a correlated dataset; receiving a segmentation request for determining a plurality of users that qualify for a segment, the segmentation request including a set of segment rules to apply to the correlated dataset; determining, by accessing the correlated dataset, whether each user of the plurality of users qualifies for the segment based on the segment rule; and storing an indication of the segment in the correlated dataset for each user determined to qualify for the segment.

6 Claims, 7 Drawing Sheets

```
string SQL_JoinedAudiences =
        "SELECT * FROM
        first_party_demo,
        first_party_behaviors,
        third_party_behaviors,
        audience_matches,
        offline_transaction_behaviors,
        online_transaction_behaviors,
        mobile_location_behaviors,
        user_mappings
        WHERE
        first_party_demo.login_id = user_mappings.login_id AND
        first_party_behaviors.login_id = user_mappings.login_id AND
        third_party_behaviors.synched_cookie_id = user_mappings.syched_cookie_id
AND
        audience_matches.audience_user_id = user_mappings.audience_user_id AND
        online_transaction_behaviors.customer_id = user_mappings.customer_id AND
        offline_transaction_behaviors.customer_id = user_mappings.customer_id AND
        mobile_location_behaviors.device_id = user_mappings.device_id;";

DBRecords propsectiveAudience = GetRecords(SQL_JoinedAudiences);

decimal minPropensity = .72;
TargetAudienceCriteria targetAudienceCriteria = new
TargetAudienceCriteria("Auto_Intender", .44, "LuxuryCar_Interest", .55,
"Upscale_Suburbs", .21, "2_or_more_visits_to_dealer_in_6_months", .30,
"Current_SUV_owner", .85);    //interest categories and relative weight string[] UserIdsToTarget = ScoreAudience(propsectiveAudience,
targetAudienceCriteria, minPropensityToAct);

StageTargetAudience(UserIdsToTarget);
```

FIG. 6

SYSTEMS AND METHODS FOR DETERMINING SEGMENTS OF ONLINE USERS FROM CORRELATED DATASETS

TECHNICAL FIELD

Various embodiments of the present disclosure relate to systems and methods for determining segments from correlated datasets. More specifically, particular embodiments of the present disclosure relate generally to determining segments from correlated datasets from a plurality of advertising data sources over an electronic network.

BACKGROUND

Targeted marketing has long been known as an effective method for reaching consumers users. When the consumer receives relevant content (advertisements, etc.) from a content provider, the consumer is more likely to patronize the particular content provider, make purchases, and provide additional personal information that may assist the content provider in providing services to the consumer. As such, targeted marketing can lead to a more focused and robust interaction with the consumer, and can lead to more rewarding interactions for the content provider by generating increased revenue.

In order to effectively target a consumer, it may be desirable for marketing systems to react to consumer information received from a variety of online and offline sources. These sources may include databases and servers, as well as multiple web properties within a network of affiliated websites. Moreover, the consumer information may be collected from a variety of sources in diverse formats. It may also be desirable for marketing systems to interact with the systems that actually deliver the content to the user. In short, an effective marketing system may appreciate the characteristics and preferences of a specific user regardless of the number or type of channels through which contact with the user is made.

Some known systems, however, are only adapted to receive information from a single source (e.g., registration information provided by the consumer). Other systems may receive information from multiple sources, but are unable to usefully combine information relating to the same consumer and communicate it to the necessary content delivery system. Thus, it may be desirable to have a system and method for determining relevant content that integrates with and aggregates data from various sources, including the underlying systems that deliver content to the consumer.

Known systems for delivering targeted content to consumers are focused on reaching the greatest quantity of consumers, without considering the value of interacting with each particular consumer. For example, some systems may deliver "targeted" content to each member of a group of consumers based on the fact that each subscribes to the same magazine. These systems, however, do not consider that only a portion of the group may make on-line purchases, for example, in addition to subscribing to the magazine. This failure to recognize and differentiate "valuable" consumers can lead to lost revenue for the content provider. In addition, the delivery of content to a significant volume of low-value consumers may expend valuable system resources. Accordingly, it may be desirable to have a means of delivering the appropriate content to the appropriate user in order to maximize the value of the relationship between the content provider and the consumer.

SUMMARY OF THE DISCLOSURE

According to certain embodiments, methods are disclosed for determining segments of online users from a correlated dataset. One method includes receiving, over a network, a plurality of datasets including user-related data of a plurality of users, each dataset being transmitted from a data owner; correlating, by at least one processor, the plurality of datasets into a correlated dataset; receiving a segmentation request for determining a plurality of users that qualify for a segment, the segmentation request including a set of segment rules to apply to the correlated dataset; determining, by accessing the correlated dataset, whether each user of the plurality of users qualifies for the segment based on the segment rule; and storing an indication of the segment in the correlated dataset for each user determined to qualify for the segment.

According to certain embodiments, systems are disclosed for determining segments of online users from a correlated dataset. One system includes a data storage device storing instructions for determining segments from a correlated dataset; and a processor configured to execute the instructions to perform a method including: receiving, over a network, a plurality of datasets including user-related data for a plurality of users, each dataset being transmitted from a data owner; correlating, by at least one processor, the plurality of datasets into a correlated dataset; receiving a segmentation request for determining a plurality of users that qualify for a segment, the segmentation request including a set of segment rules to apply to the correlated dataset; determining, by accessing the correlated dataset, whether each user of the plurality of users qualifies for the segment based on the segment rule; and storing a qualification for the segment in the correlated dataset for each user determined to qualify for the segment.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 6 depicts pseudo code in which mappings of the user identifier and user-related data are changed from that of a data owner to the data manager, according to embodiments of the present disclosure.

DESCRIPTION OF THE EMBODIMENTS

Figure 1:
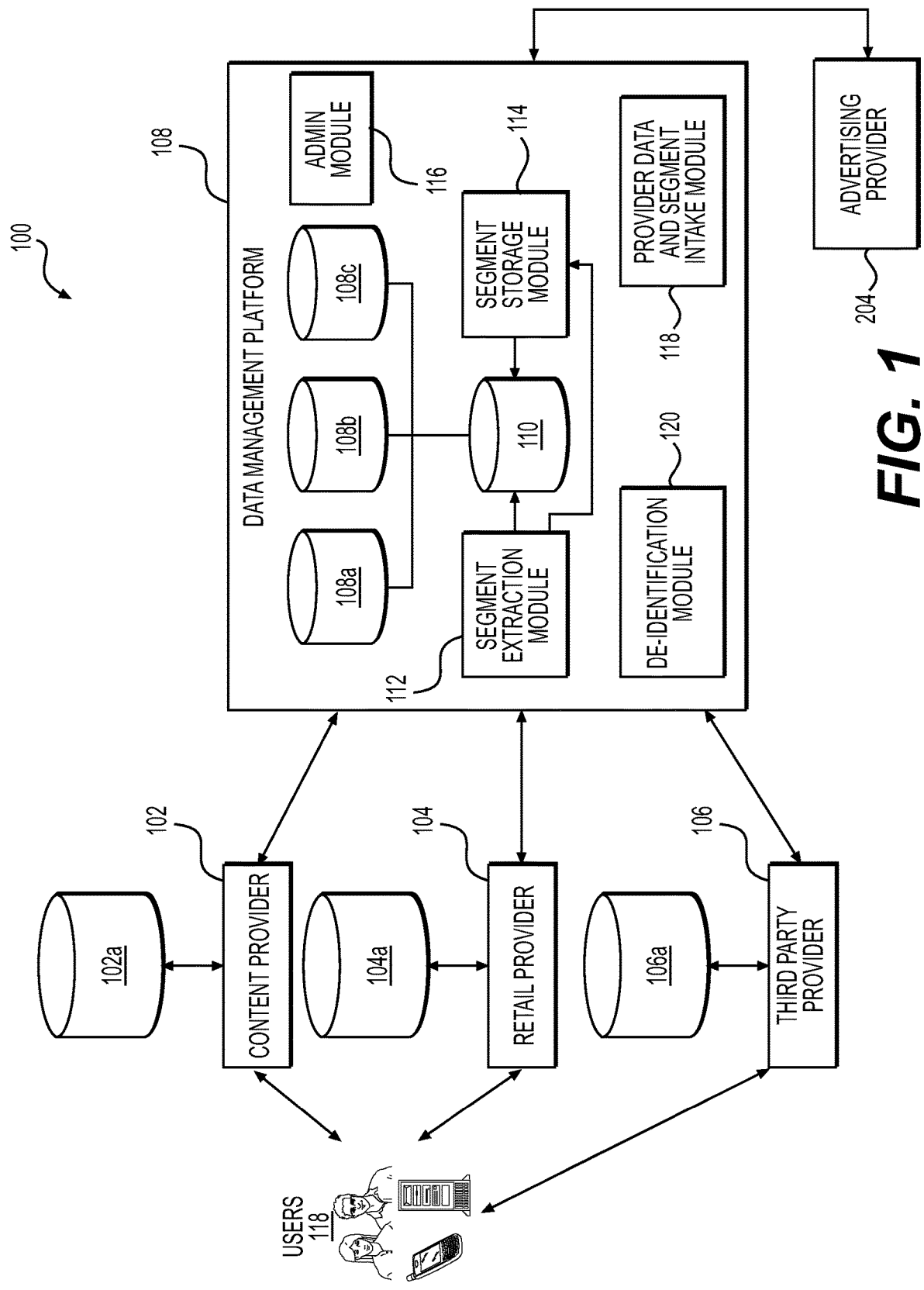
FIG. 1 illustrates an exemplary segment extraction system for determining segments from correlated datasets, according to embodiments of the present disclosure.

Reference will now be made in detail to the exemplary embodiments of the disclosure, examples of which are illustrated in the accompanying drawings. Wherever possible, the same reference numbers will be used throughout the drawings to refer to the same or like parts.

In one embodiment of the disclosure, methods and systems are described for determining segments from a dataset correlated from a plurality of datasets from a plurality of data owners. A data owner may collect, analyze, and compile user-related data that relates to a plurality of users. User-related data for each user may include information stored in browser cookies and/or browser storage. Additionally, user-related data may include information extracted from surveys, purchases, etc. Data owners may use the user-related data to generate and deliver web content and/or other content that is targeted to a particular user and/or audience. These data owners acquire, generate, store, and/or use vast amounts of user-related data, and may wish to sell, lease, and/or share its user-related data with data consumers, which may include other data owners, data brokers, Internet advertisers, data management platform services, and/or other industries that generate and/or store user-related data. As will be explained below, data owners may desire to share their user-related data with others, but now provide direct access to the raw user-related data. For example, an advertiser may use the user-related data of a publisher to evaluate an advertising campaign, but the advertiser may not have access to the raw user-related data of the publisher to obtain the evaluation.

Data owners may use this user-related information to help motivate a user to perform certain actions ("an event") related to a piece of content. An event related to the piece of content may be, for example, making a purchase from an online store and/or retail store, providing an email for a sign-up, making a social network connection, and/or performing a social network "like," and so on. The piece of content related to the event may include, but is not limited to, a web page of a website, an image, a video, and/or a flyer received in the mail. The event data may be stored in association with the user as user-related data. Along with the event data, content data about the piece of content and/or other user-related data about a user may also be stored in a dataset of a database of a data owner. The event data, content data, and/or user-related data (collectively hereafter, referred to as "user-related data") may be used to extract segment information about the user. A dataset may correspond to the related data stored in a database. For example, a dataset may comprise data for one or more users that is stored in a database. A segment may be a subset of related data of a dataset. For example, users who have a common interest in a "fly fishing" may be a segment of users in a dataset of users.

Typically, a browser cookie may store user-related data on a user's computer for later transmission to a content provider, advertising provider, and/or a data management platform. The browser cookie allows storage of a user's web browsing activity. In one embodiment, such information may be collected from browser cookies and analyzed by data owners to determine various segments in which a user may belong. For example, browser cookie data may indicate that a user has visited a website that sells airline tickets on multiple occasions. A segment that may be extracted from such data may be that the user qualifies for a "frequent-traveler" segment. Once the segment is extracted, targeted content, such as travel insurance advertisements, may subsequently be delivered to the user on future website visits. Numerous configurations and variations of such techniques will become apparent in light of this disclosure.

FIG. 1 illustrates an exemplary segment extraction system 100 for determining segments from correlated datasets. In the illustrated embodiment, segment extraction system 100 may include a plurality of data providers for the system. As shown in FIG. 1, data providers may include one or more of content data providers 102, retail data providers 104, and/or third-party data providers 106. Each of the content data providers 102, retail data providers 104, and third-party data providers 106 may have one or more respective databases 102a, 104a, 106a that store user-related data relating to one or more users 118. The one or more respective databases 102a, 104a, 106a may also store segment extraction data that relates to rules, procedures, models, and so on, for determining segments from the user-related data.

Each of the content data providers 102, retail data providers 104, and third-party data providers 106 may be communicatively coupled over a network, such as the Internet, to a data management platform ("DMP") 108. A DMP may be a centralized system and/or server in which any type of data may be aggregated from multiple sources. The DMP 108 may receive user-related data from each of the content data providers 102, retail data providers 104, and third-party data providers 106 and store the user-related data in respective datasets of databases 108a, 108b, and 108c via a provider data and segment intake module 118. Upon receiving the user-related data, the DMP 108 may correlate the user-related data from the datasets 108a, 108b, and 108c into a correlated dataset of correlated database 110. The provider data and segment intake module 118 may also be used to receive respective segment extraction data from each of the content data providers 102, retail data providers 104, and third-party data providers 106, and store the segment extraction data in respective datasets of databases 108a, 108b, and 108c, and/or in the correlated dataset 110.

DMP 108 may include segment extraction module 112. Segment extraction module 112 may collect, aggregate, store, combine, and/or provide insights on user behavioral and demographic data from the correlated dataset of correlated database 110. For example, segment extraction module 112 may use the segment extraction data from each of the respective content data providers 102, retail data providers 104, and third-party data providers 106 on the correlated dataset of correlated database 110 and/or on one or more of the respective datasets of databases 108a, 108b, and 108c. Alternatively, the segment extraction module 112 may use the respective segment extraction data on the respective data provider's user-related data.

As shown in FIG. 1, DMP 108 may allow user-related data to be received from a plurality of online and/or offline data sources. DMP 108 may receive user-related online data from one or more of online content data providers 102, online retail data providers 104, and/or online third-party data providers 106. User-related online data may be data collected from one or more users' online activities. DMP 108 may also receive user-related offline data from one or more of content data providers 102, retail data providers 104, and/or third-party data providers 106. User-related offline data may be data collected from one or more users' non-online activities, e.g., purchases at brick and mortar stores, magazine subscriptions, TV viewings, etc. In some embodiments, DMP 108 may additionally or alternatively receive user-related data from its own sources (not shown). DMP 108 may provide user segment information (e.g., information indicative of segment qualification) to one or more of content data providers 102, retail data providers 104, third-party data providers 106, demand side platforms ("DSP"), supply side platforms ("SSP"), and/or onsite advertisement servers. A DSP may be an advertising campaign management application which allows advertisers to manage their campaign/creative bidding rules, use user-related data at scale, and/or bid on available display advertising inventory. An SSP may be a platform that aggregates publisher advertisement inventory supply and allows publishers to leverage user-related data for revenue optimization.

Each of the content data providers 102, retail data providers 104, and third-party data providers 106 may transmit user-related data in real-time to DMP 108. Additionally, each of the content data providers 102, retail data providers 104, and third-party data providers 106 may also provide bulk user-related data to DMP 108.

User-related data, whether provided in real-time or in bulk, may include a variety of information, such as cookies, hits, page views, visits, sessions, downloads, first visits, first sessions, visitors, repeat visitors, new visitors, impressions, singletons, bounce rates, exit percentages, visibility time, session duration, page view duration, time on page, active time, engagement time, page depth, page views per session, frequency, session per user, click path, click, site overlay, behavioral traits, user intents, user interests, demographic data, etc. The user-related data may describe usage and visitation patterns for websites, and/or individual web pages within a website. The user-related data may include information relating to the activity and interactions of one or more users/visitors with a given website and/or a given web page. For example, user-related data may include historic and/or current website browsing information for one or more website visitors, including, but not limited to identification of links selected, comments made, content mouse-over, user elements manipulated, web pages viewed, related content topics viewed, and other data that may help gauge user interactions with web pages and/or websites.

In some embodiments, user-related data may include information indicative of a location. For example, user-related data may include location data indicative of a geographic location of client devices of one or more users 118. In some embodiments, location data may be correlated with corresponding user activity. In some embodiments, location data includes geographic location information. For example, location data may include an indication of the geographic coordinates (e.g., latitude and longitude coordinates), metropolitan statistical area ("MSA"), IP address, or the like, for each user or device. In some embodiments, user-related location data may be included in demographic information indicative of the user 118.

In some embodiments, user-related data is accumulated over time to generate a dataset of user-related data that is representative of activity and interactions of one or more users with a given website, web page, retail store, etc. In one embodiment, such an accumulation may be performed by various retailers, advertisers, publishers, customers, etc. with respect to user-related data generated through websites, retail stores, surveys, etc. In one embodiment, such an accumulation may be performed by third-party data providers.

The user-related data may be used to qualify users in a segment based on the segment extraction data. Such a qualification of a user into a segment may be used to select an advertisement to provide to a user in the segment. The number of users qualified in a segment may be used to evaluate a value of a segment. For example, if the segment is sufficiently large, then it may be worth commencing a new advertising campaign and/or continuing an existing advertising campaign. Conversely, if the segment is small, then it may not be worth commencing a new advertising campaign directed toward that segment and/or it may be determined that a new outreach campaign should be commenced to increase the size of the segment. In some embodiments, segment extraction module 112 may use segment extraction data to extract segments from correlated dataset 110.

In some embodiments, content providers 102, retail providers 104, and third-party providers 106 may log-in to an administration (or "admin") module 116 of DMP 108 to interact with their respective user-related data to provide, create, modify, and/or apply segment extraction data. As mentioned above, the segment extraction data may then be used to qualify users into segments and/or to determine a number of users qualified for a segment. Such determinations may be used to select and place an online advertisement for one or more users.

Figure 2:
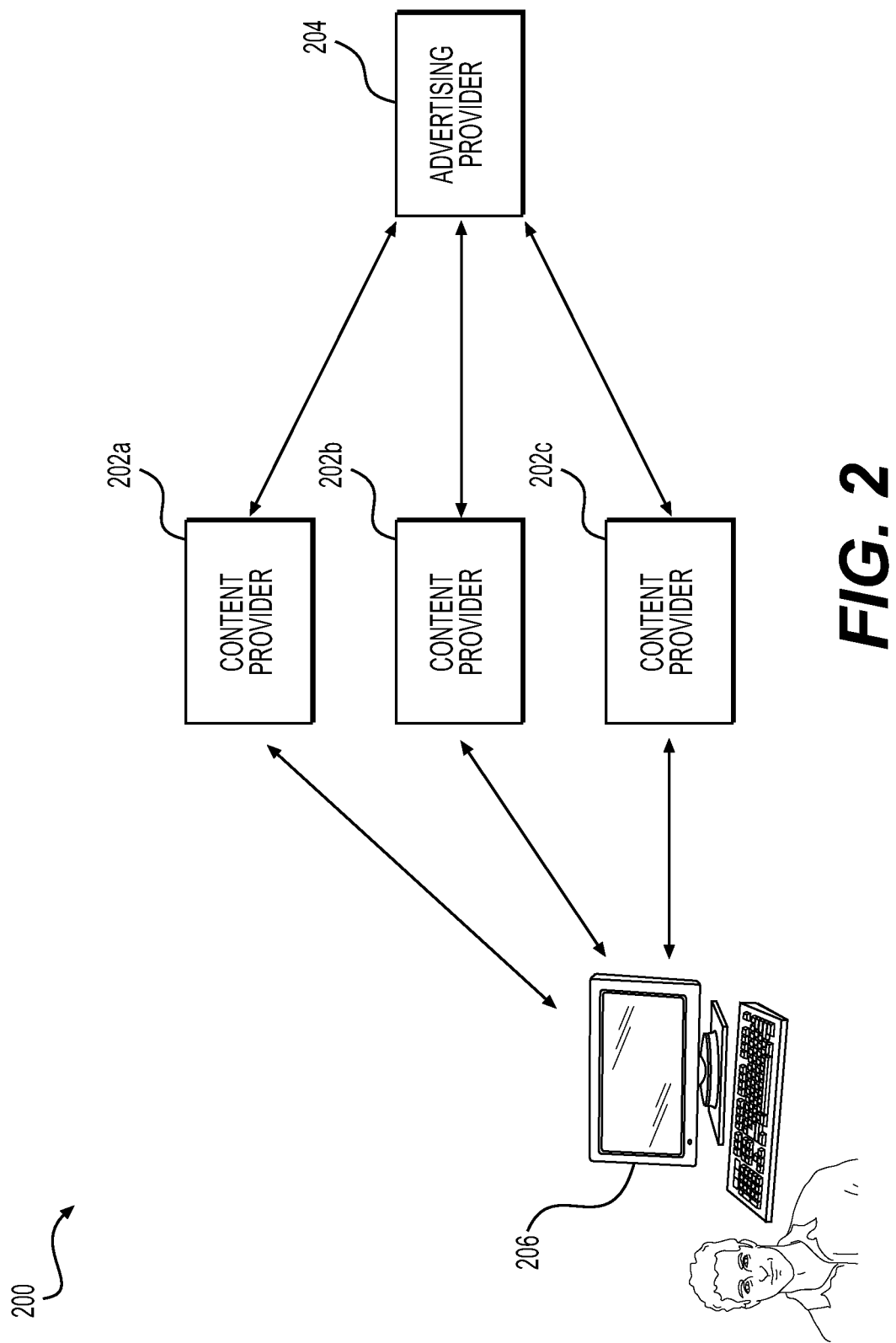
FIG. 2 illustrates an exemplary user-related data aggregation system for obtaining user-related data to be stored in data provider datasets, according to embodiments of the present disclosure.

FIG. 2 illustrates an exemplary user-related data aggregation system 200 for obtaining user-related data to be stored in data provider datasets. In the illustrated embodiment, data aggregation system 200 may include a plurality of content providers 202a, 202b, and 202c that provide content to a user 206. As shown in FIG. 2, content provider 202a, 202b, and 202c may provide digital content to a user 206 via a network, such as the Internet. When a user 206 visits a website of a content provider 202a, 202b, and/or 202c that provides advertisements from an advertising provider 204, a cookie and/or user identifier may be stored on the user's computer.

When the user 206 subsequently visits a website of a content provider that provides advertisements from an advertising provider 204, the cookie and/or user identifier may be forwarded to the advertising provider 204 from the content provider visited by the user 206, along with a request for an advertisement. The advertising provider 204 may receive and store the advertisement request including the user identifier. The advertising provider 204 may then determine one or more interest segments of the content provider that provided the advertising request, and store the one or more interest segments in association with the user identifier. For example, if the content provider provides a sports news website to a user 206, then the advertising provider may store an interest segment of "news-sports" in association with the user identifier for the user 206. Additionally, or alternative, a counter of an interest segment may be increased for each visit to a "news-sports" related website of a content provider.

The advertising provider 204 may also examine one or more interest segments associated with the user identifier without having direct access to the raw user-related data. After examining the interest segments associated with the user identifier, the advertising provider 204 may determine a most relevant advertisement to provide the content provider among a plurality of available advertising campaigns. The advertising provider 204 may then provide the determined advertisement to the content provider, and the content provider may provide the determined advertisement to the user 206.

Figure 3:
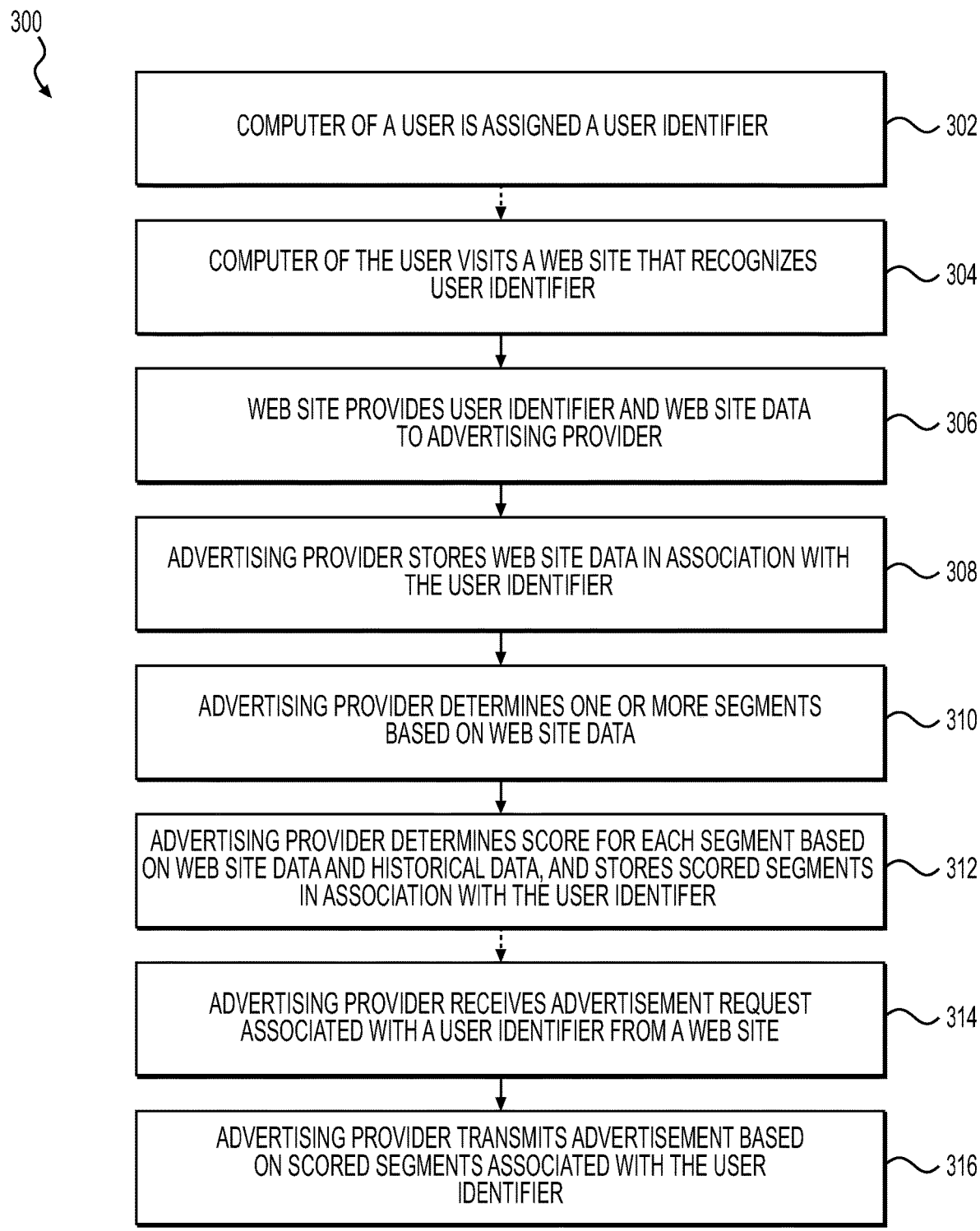
FIG. 3 depicts an exemplary method that determines and scores segments of user data and provides advertisements based on segments of a user, according to embodiments of the present disclosure.

FIG. 3 depicts an exemplary method 300 that determines and scores segments for user data and provides advertisements based on segments of a user. This method may allow content providers, such as websites, to recognize repeat visitors. A visitor may be assigned a user identifier that may be used to recognize when the user visits the website. The content provider may provide the user identifier to an advertising provider, along with information about the content provider, such as the content provider is a travel website. The advertising provider may store information about the user, such as "frequent traveler," in association with the user identifier. This stored information may be used to provide advertisements that are relevant to the user.

As shown in FIG. 3, the method 300 begins at step 302 with a computer of a user being assigned a user identifier, such as the user identifier discussed above with reference to FIG. 2. A user may visit a website of a content provider that uses advertisements from an advertising provider, such as advertising provider 204. The content provider may assign a user identifier that the content provider and/or advertising provider will recognize when the user visits a website of the content provider.

After the computer of a user has been assigned a user identifier, at any time in the future, the user of the computer may visit a website of a content provider that recognizes the user identifier at step 304. If the content provider recognizes the user identifier, the content provider of the website may provide the user identifier, along with website data, to the advertising provider at step 306. If desired by the content provider, the content provider may provide their user-related data associated with the user identifier to the advertising provider.

The advertising provider, after receiving the user identifier and website data, may store the website data in association with the user identifier in a dataset of a database, such as databases 102a, 104a, and 106a, at step 308. The data may be stored in a raw form and later used to derive segments.

After the data is stored in association with the user identifier, the advertising provider may, at step 310, determine one or more segments based on the website data provided with the user identifier. For example, if the website of the content provider is "fun-fitness-for-you.com," the advertising provider may determine that a category of the segment is "health & fitness." If the website of the content provider is "daily-diet-tips-for-you.com," the advertising provider may determine categories of segments are "health & fitness" and "food & beverage."

Once the one or more segments are determined based on the website data, the advertising provider, at step 312, may determine a score for each segment based on the website data and/or historical user-related data, and store the scored segments in association with the user identifier. For example, if the website of the content provider is "fun-fitness-for-you.com," the segment is "health & fitness," and the user visits the website multiple times a day, the segment score of "health & fitness" stored in association with the user identifier may be a 29, for example. If the website of the content provider is "all-sports-scores-now.com," the segment is "news-sports," and the user has never visited the website before, the segment score of "news-sports" may be 1, for example. Once scores for each of the one or more segments are determined, the advertising provider may store the scored segments in association with the user identifier at step 312.

At step 314, the advertising provider may receive an advertisement request from a content provider of a website, along with a user identifier for a user in which the advertisement is to be provided. At step 316, the advertising provider may transmit an advertisement for presentation to the user associated with the user identifier based on the scored segments associated with the user identifier.

Figure 4:
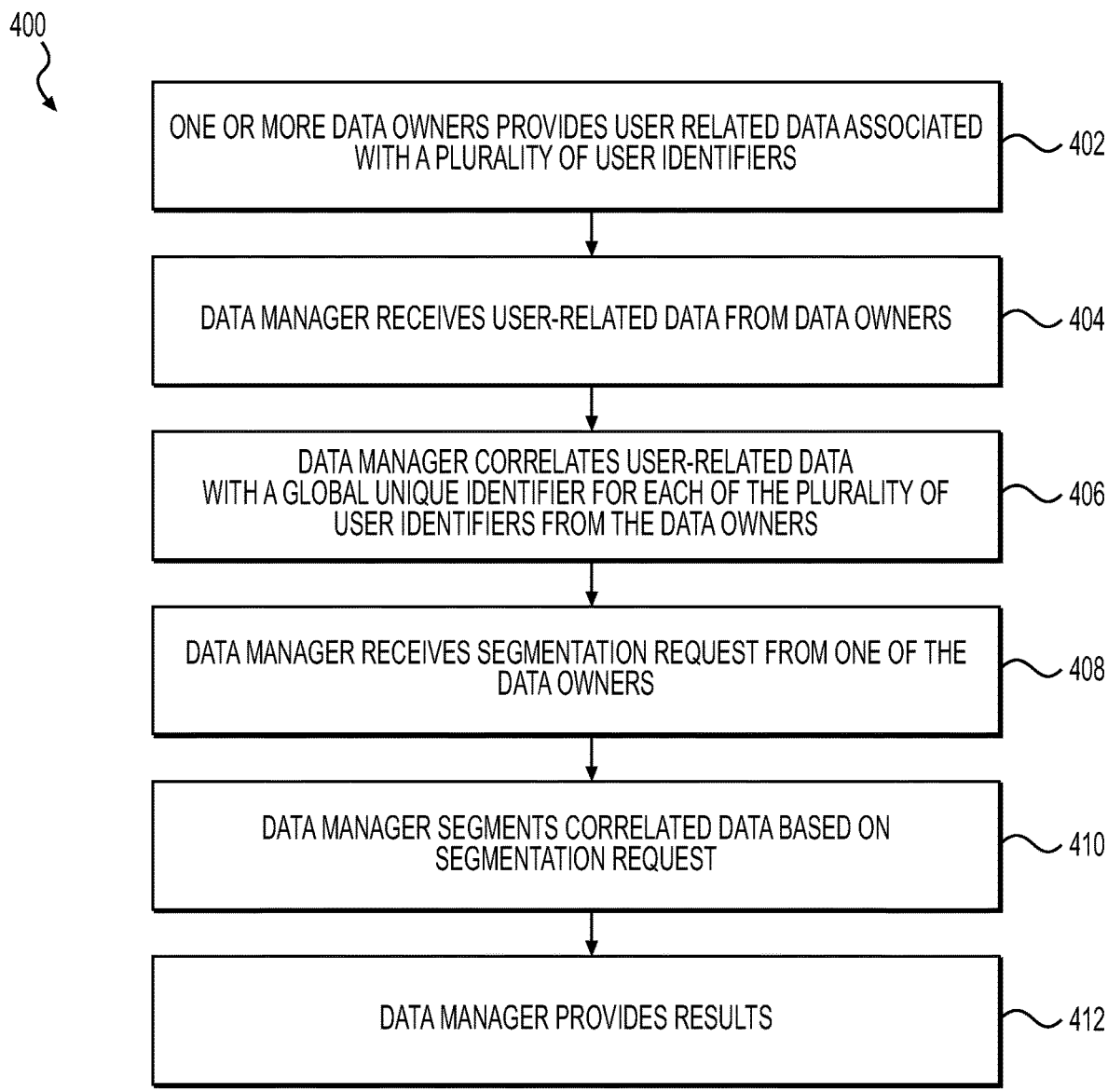
FIG. 4 depicts an exemplary method for determining segments from correlated datasets, according to embodiments of the present disclosure.

FIG. 4 depicts an exemplary method 400 for determining segments from correlated datasets. A DMP, such as DMP 108, may determine users that are members of a segment from combined data from multiple data providers, such as content provider 102, retail provider 104, and third-party provider 106. This data may be used by advertising providers, such as advertising provider 204, to accurately target advertisements to the users determined to be members of the segment.

As shown in FIG. 4, the method 400 begins at step 402 with one or more data owners, such as content providers 102, retail providers 104, and third-party providers 106, providing user-related data that is associated with their respective plurality of user identifiers to a data manager, such as data management platform system 108. In one embodiment, data owners may map a data owner format of their respective user-related data to a data manager format of user-related data. For example, the user identifier of the data owner may be mapped to a user identifier of the data provider, e.g., DMP 108. Additionally, or alternatively, a format of user-related data associated with each user identifier of the data owner may be mapped to a format of user-related data associated with each user identifier of the data manager. FIG. 6 depicts pseudo code 600 in which mappings of the user identifier and user-related data are changed from that of a data owner to the data manager. In an alternative embodiment, the data manager may map the data owner format to the data manager format.

As shown in FIG. 6, user-related data for a particular user identifier may include first-party demographic data, first-party behavior data, third-party behavior data, audience match data, offline transaction behavior data, online transaction behavior data, mobile location data, user mapping data, and so on. Each of these particular data types may have a format that may be mapped to a format to be used by the data manager. For example, the data manager may use the user mapping data to map each of the other data types to a data format that may be used globally by the data manager.

At step 404, the data manager receives the user-related data that is associated with a plurality of user identifiers. In one embodiment, the data manager may associate the user identifier mapped to the data manager's user identifiers with a global user identifier in a correlated dataset.

After receiving the user-related data, the data manager may correlate the user-related data with user-related data of other data owners and/or with user-related data of the data manager at step 406. The data manager may, for example, combine the user-related data for a user with global user identifier "A" from each of the dataset of databases 108*a*, 108*b*, and 108*c*, and store the combined user-related data in association with global user identifier "A" in a dataset of database 110.

After user-related data of a data owner has been correlated into a correlated dataset, the data manager at step 408 may receive a segmentation request from one of the data owners. Alternatively, the segmentation request may be from a third-party advertiser. The data manager may then segment the correlated data at step 410 based on the segmentation request. For example, a segmentation request may be a request for user identifiers of users that may have an interest in a luxury automobile advertisement campaign based on segment extraction data from one of the data owners. The segmentation request may include a minimum segment score for user identifiers that may be interested in a luxury automobile advertisement campaign. Various segments that may be targeted for the campaign may include segments, such as, "Auto_Intender" with a minimum score of 10, "LuxuryCar_Interest" with a minimum score of 5, "Upscale_Suburbs" with a minimum score of 21, "2_or_more_visits_to_dealer_in_6_months" with a minimum score of 3, and/or "Current_SUV_owner" with a minimum score of 8. The data manager at step 410 may determine which global user identifiers are associated with one or more of the above-mentioned segments. Upon determining which global user identifiers are associated with one or more of the above-mentioned segments, at step 412, the data manager may provide results to the requestor. For example, the data manager may transmit a list of global user identifiers that are associated with the one or more segments to the requestor via the Internet. Alternatively, or additionally, the data manager may store the results, and allow the requestor to access the results through the DMP 108, such as through admin module 116.

Figure 5:
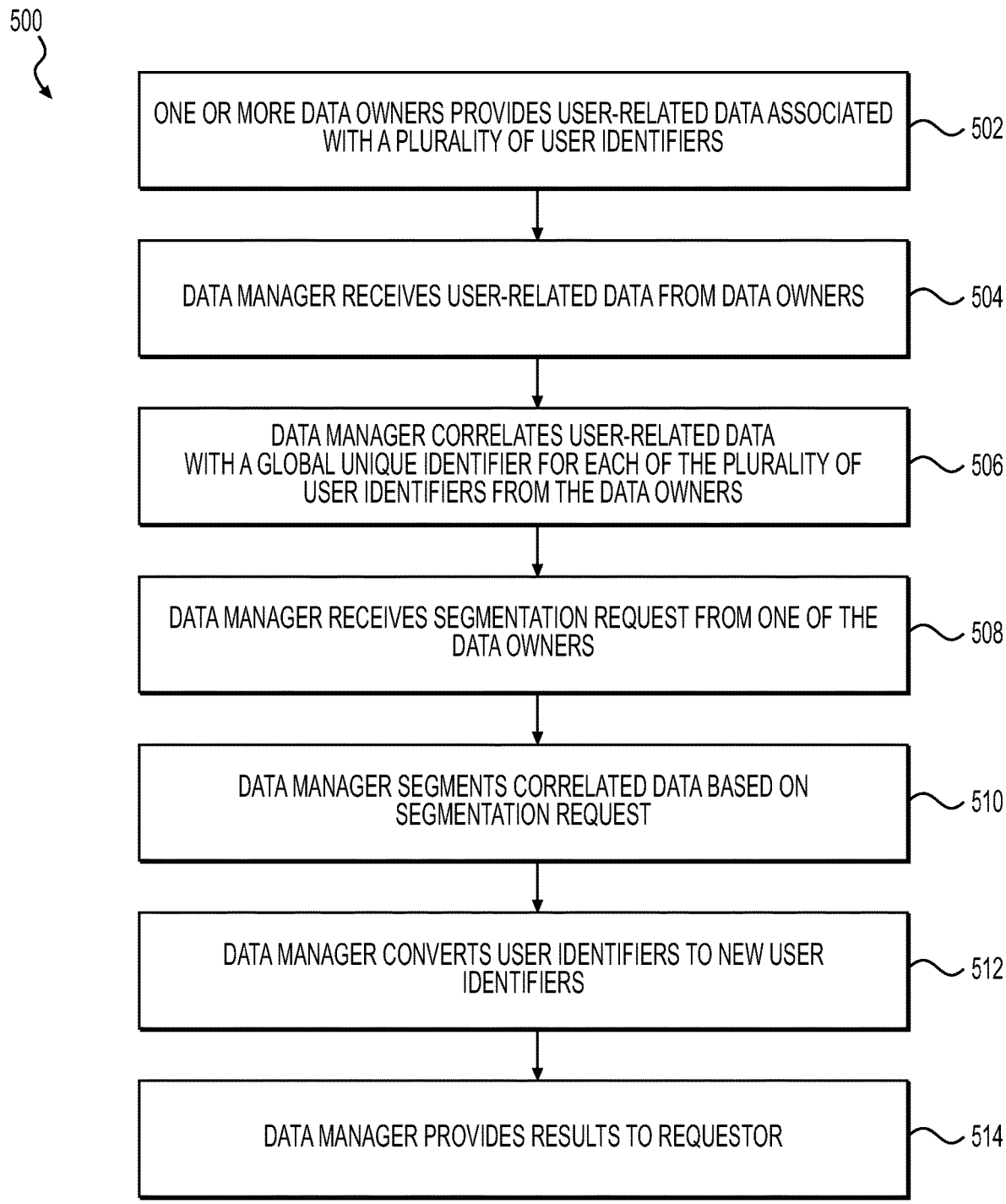
FIG. 5 depicts another exemplary method for determining segments from correlated datasets and for providing de-identified results, according to embodiments of the present disclosure.

FIG. 5 depicts another exemplary method 500 for determining segments from correlated datasets and for providing de-identified results. As mentioned above in regard to FIG. 4, a DMP, such as DMP 108, may determine users that are members of a segment from combined data from multiple data providers, such as content provider 102, retail provider 104, and third-party provider 106. This data may be used by advertising providers, such as advertising provider 204, to accurately target advertisements to the users determined to be members of the segment. De-identification of data may prevent users of the DMP from incorporating the results into their own respective data sets while still allowing for useful results. Additionally, de-identification may ensure that user identities are kept private.

As shown in FIG. 5, the method 500 may begin at step 502 with one or more data owners, such as content providers 102, retail providers 104, and third-party providers 106, providing user-related data that is associated with their respective plurality of user identifiers to a data manager, such as data management platform system 108. In one embodiment, data owners may map a data owner format of their respective user-related data to a data manager format of user-related data. For example, the user identifier of the data owner may be mapped to a user identifier of the data provider. Additionally, or alternatively, a format of user-related data associated with each user identifier of the data owner may be mapped to a format of user-related data associated with each user identifier of the data manager. FIG. 6 depicts pseudo code 600 in which mappings of the user identifier and user-related data are changed from that of a data owner to the data manager. In an alternative embodiment, the data manager may map the data owner format to the data manager format.

At step 504, the data manager may receive the user-related data that is associated with a plurality of user identifiers. After receiving the user-related data, the data manager may correlate the user-related data with user-related data of other data owners and/or with user-related data of the data manager at step 506. In one embodiment, the data manager may associate the user identifier mapped to the data manager's user identifiers with a global user identifier in a correlated dataset.

After user-related data of a data owner has been correlated into a correlated dataset, the data manager at step 508 may receive a segmentation request from one of the data owners. Alternatively, the segmentation request may be from a third-party advertiser. At step 510, the data manager may then segment the correlated data based on the segmentation request. For example, a segmentation request may be a request for user identifiers of users that may have an interest in, e.g., a luxury automobile advertisement campaign. The segmentation request may include a minimum segment score for user identifiers that may be interested in a luxury automobile advertisement campaign. Various segments that may be targeted for the campaign may include segments, such as, "Auto_Intender" with a minimum score of 10, "LuxuryCar_Interest" with a minimum score of 5, "Upscale_Suburbs" with a minimum score of 21, "2_or_more_visits_to_dealer_in_6_months" with a minimum score of 3, and/or "Current_SUV_owner" with a minimum score of 8. At step 510, the data manager may also determine which global user identifiers are associated with one or more of the above-mentioned segments.

Upon determining which global user identifiers are associated with one or more of the above-mentioned segments, at step 512, the data manager may convert user identifiers of the results into new user identifiers. The user identifiers of the results, which are global user identifiers, may be de-identified to prevent the segment requestor from re-identifying the users. This may ensure that data owners are not incorporating other data owner's user-related data into their own respective datasets.

De-identification may be implemented by hashing the global user identifiers. In another embodiment, the global user identifiers may be salted and hashed. In some cases, the de-identified dataset may not be joined back into a segment requestor's dataset. If the segmentation request wishes to re-run the segmentation request, the de-identification may still allow the request to compare the original results and the updated results because the de-identified global user identifiers for each of the users would remain the same. Upon de-identifying the global user identifiers that are associated with one or more of the above-mentioned segments, at step 512, the data manager may provide results to the requestor.

Referring back to FIG. 1, the segment extraction module 112 may be operatively connected to the correlated database 110. The correlated database 110 may be used to store the correlated dataset and segment extraction data relating to user. The segment extraction module 112 may routinely update the user-related data and segment extraction data in the correlated database 110. As new or modified user-related data becomes available from the databases 108*a*, 108*b*, and 108*c* and correlated into correlated database 110, the segment extraction module 112 may modify the user-related data for a user.

The data extraction module 112 may be a program that is used to parse and identify user-related data from within a set of data. The data extraction module 112 may be constructed using Java, Perl, C++, C#, SQL, or any other similar programming language. The data extraction module 112 may reside on the DMP 108, or multiple servers. The data extraction module 112 may be governed by a set of segment rules of the segment extraction data, which may have been provided by one of the data owners and/or a third-party. The segment rules may include a series of text rules (using matching utilities such as string matching or regular expressions) that are used to transform data in one form into a more standardized form while removing unnecessary data. The extraction rules may include, for example, a statement such as "if string contains 'A' then output result 'B'," and store the result 'B' in association with the user-related data of a qualifying global user identifier.

User-related data may include attributes of a user who will qualify for inclusion in the segment that may be defined by a set of segment rules. The segment rules of the segment extraction data may be selected using the admin module 116. Any number and/or range of attributes may be used to govern qualification for a segment. The segment extraction module 112 may search the user-related data stored in correlated database 110 to determine which users qualify for a segment. This search may be carried out at the request of the data owner and/or a third-party and, if desired, may be conducted on a routine basis, such as daily. In this manner, qualification in a segment may be maintained up to date.

As discussed above, the correlated database 110 may store segment data and/or an indication of inclusion in a segment that indicates the users that are included in a particular segment. It may be appreciated that the segment data may indicate that a user is classified in more than one segment. The segment data may be defined by a set of segment rules based upon the behavior and characteristics in the user-related data. Once a set of segment rules that define the segment data are identified, a segment identifier may be assigned to that particular set of segment rules. In an alternative embodiment, user-related data for users stored in the correlated database 110 may also be manually analyzed to build segments.

Provider data and segment module 118 may receive user-related data and segment extraction data from one or more of content provider 102, retail provider 104, and/or third-party provider 106. Once the user-related data and segment extraction data is received, the provider data and segment intake module 118 may index and store the received data into respective databases 108a, 108b, and and/or 108c. Then, the datasets of databases 108a, 108b, and 108c may be correlated and stored in correlated database 110.

The segment extraction module 112 may extract user identifiers that qualify for segments from the correlated database 110 using segment rules, and may also instruct segment storage module 114 to store segment rules and extracted segmented data in the correlated database 110. In order to determine whether a user that corresponds to a user identifier qualifies as a member of a segment, the segment extraction module 112 may access correlated database 110. The segment extraction module 112 may then determine which users qualify for a segment based on a segment rule being applied. When a user qualifies for a segment according to a segment rule, the segment extraction module 112 may instruct the segment storage module to store the qualifying result in association with the one or more qualified user identifiers in the correlated database 110. Determining whether a user qualifies as a member of the segment according to the segment rule may include evaluating the user-related data provided by one or more of content provider 102, retail provider 104, and/or third-party provider 106.

According to an embodiment of the present disclosure, a segment rule may be received by the provider data and segment intake module 118 of the data management platform 108. Alternatively, or additionally, one or more of content provider 102, retail provider 104, and/or third-party provider 106 may create segment rules in the data management platform 108 via admin module 116. In one embodiment, the segment rule of one of content provider 102, retail provider 104, and third-party provider 106 may be accessed and shared by other content providers 102, retail providers 104, and third-party providers 106 to use on their respective datasets and/or on the correlated dataset of correlated database 110.

Figure 7:
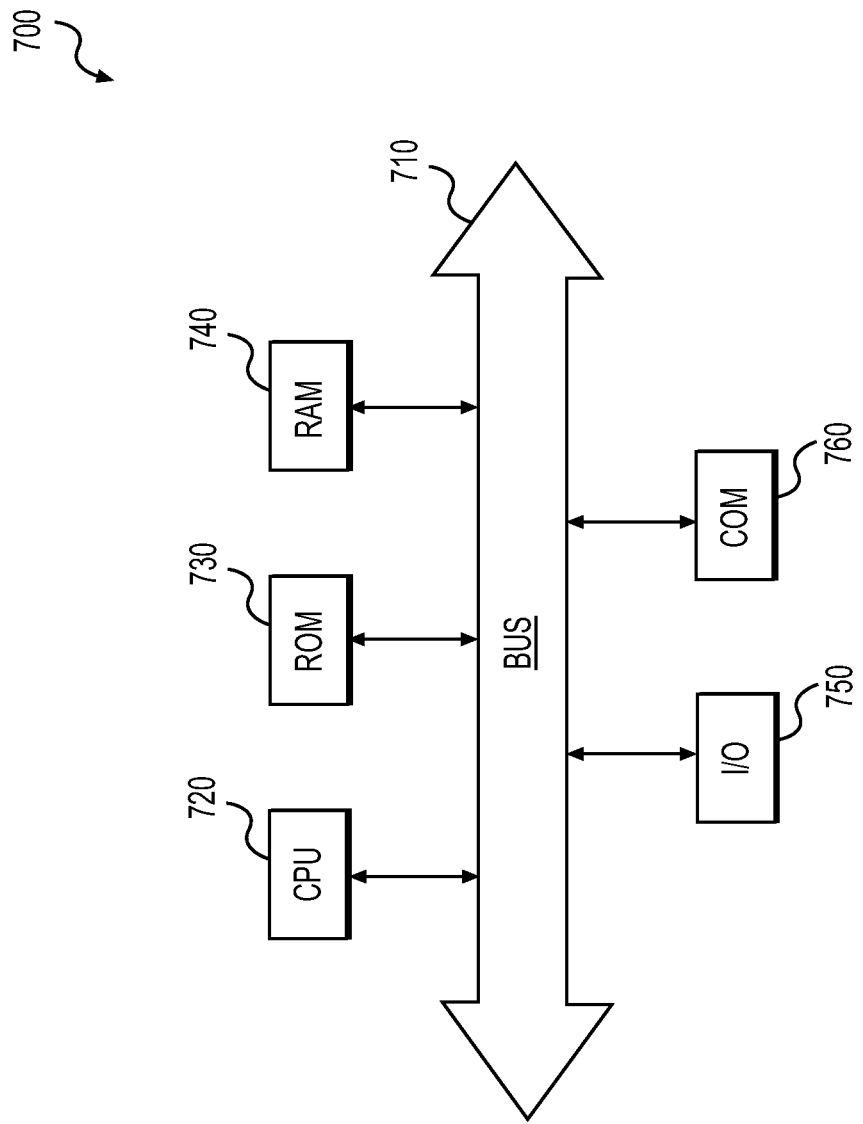
FIG. 7 is a simplified functional block diagram of a computer that may be configured as a device or server for executing the methods of FIGS. 3, 4, and/or 5, according to exemplary embodiments of the present disclosure.

FIG. 7 is a simplified functional block diagram of a computer that may be configured as a client, agent, or server for executing the methods of FIGS. 3, 4, and 5, according to exemplary an embodiment of the present disclosure. Specifically, in one embodiment, any of the modules, servers, systems, and/or platforms may be an assembly of hardware 700 including, for example, a data communication interface 760 for packet data communication. The platform may also include a central processing unit ("CPU") 720, in the form of one or more processors, for executing program instructions. The platform typically includes an internal communication bus 710, program storage, and data storage for various data files to be processed and/or communicated by the platform such as ROM 730 and RAM 740, although the system 700 often receives programming and data via network communications 770. The server 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for determining segments of online users from a correlated dataset, comprising:
    receiving, by at least one processor of a centralized server over a network, a plurality of datasets from a first data owner, the plurality of datasets including user-related data of a plurality of users, wherein the user-related data includes location data indicative of a geographic location of client devices of one or more users;
    correlating, by the at least one processor of the centralized server, one or more datasets of the received plurality of datasets into a correlated dataset, the correlated dataset associated with one or more global user identifiers to identify each of the plurality of users of the plurality of datasets in the correlated dataset;
    receiving, by the at least one processor of a centralized server, a segmentation request from the first data owner for determining a plurality of users that qualify for a segment, the segmentation request including a set of segment rules for determining a plurality of users that qualify for the segment, wherein the segment rules include a minimum segment score associated with the user-related data;
    determining, by the at least one processor of the centralized server, whether one or more global user identifiers qualify for the segment based on the segment rules and a score associated with the user-related data;
    converting, by a de-identification operation of the at least one processor of the centralized server, the determined one or more global user identifiers to a de-identified set of user identifiers, the de-identification operation including a salting and hashing of the determined one or more global user identifiers, the de-identification operation configured to prevent the first data owner from i) re-identifying any one of the plurality of users of the determined one or more global user identifiers, and ii) incorporating user-related data of a second data owner; and
    transmitting, by an advertiser provider, an advertisement for presentation to each user determined to qualify for the segment based on the score associated with the user-related data of the first data owner.

2. The method of claim 1, further comprising:
    transmitting, to the first data owner of the segmentation request after determining the de-identified set of user identifiers, the de-identified set of user identifiers of each user determined to qualify for the segment.

3. A system for determining segments of online users from a correlated dataset, the system including:
    a data storage device storing instructions for determining segments from a correlated dataset; and
    a processor configured to execute the instructions to perform a method including:
    receiving, by at least one processor of a centralized server over a network, a plurality of datasets from a first data owner, the plurality of datasets including user-related data of a plurality of users, wherein the user-related data includes location data indicative of a geographic location of client devices of one or more users;
    correlating, by the at least one processor of the centralized server, one or more datasets of the received plurality of datasets into a correlated dataset, the correlated dataset associated with one or more global user identifiers to identify each of the plurality of users of the plurality of datasets in the correlated dataset;
    receiving, by the at least one processor of a centralized server, a segmentation request from the first data owner for determining a plurality of users that qualify for a segment, the segmentation request including a set of segment rules for determining a plurality of users that qualify for the segment, wherein the segment rules include a minimum segment score associated with the user-related data;
    determining, by the at least one processor of the centralized server, whether one or more global user identifiers qualify for the segment based on the segment rules and a score associated with the user-related data;
    converting, by a de-identification operation of the at least one processor of the centralized server, the determined one or more global user identifiers to a de-identified set of user identifiers, the de-identification operation including a salting and hashing of the determined one or more global user identifiers, the de-identification operation configured to prevent the first data owner from i) re-identifying any one of the plurality of users of the determined one or more global user identifiers, and ii) incorporating user-related data of a second data owner; and
    transmitting, by an advertiser provider, an advertisement for presentation to each user determined to qualify for the segment based on the score associated with the user-related data of the first data owner.

4. A non-transitory computer-readable storage medium storing program instructions for determining segments of online users from a correlated dataset, wherein the program instructions are computer-executable to implement:
    receiving, by at least one processor of a centralized server over a network, a plurality of datasets from a first data owner, the plurality of datasets including user-related data of a plurality of users, wherein the user-related data includes location data indicative of a geographic location of client devices of one or more users;
    correlating, by the at least one processor of the centralized server, one or more datasets of the received plurality of datasets into a correlated dataset, the correlated dataset associated with one or more global user identifiers to identify each of the plurality of users of the plurality of datasets in the correlated dataset;
    receiving, by the at least one processor of a centralized server, a segmentation request from the first data owner for determining a plurality of users that qualify for a segment, the segmentation request including a set of segment rules for determining a plurality of users that qualify for the segment, wherein the segment rules include a minimum segment score associated with the user-related data;

determining, by the at least one processor of the centralized server, whether one or more global user identifiers qualify for the segment based on the segment rules and a score associated with the user-related data;

converting, by a de-identification operation of the at least one processor of the centralized server, the determined one or more global user identifiers to a de-identified set of user identifiers, the de-identification operation including a salting and hashing of the determined one or more global user identifiers, the de-identification operation configured to prevent the first data owner from i) re-identifying any one of the plurality of users of the determined one or more global user identifiers, and ii) incorporating user-related data of a second data owner; and transmitting, by an advertiser provider, an advertisement for presentation to each user determined to qualify for the segment based on the score associated with the user-related data of the first data owner.

5. The system of claim 3, wherein the processor is further configured to execute the instructions to perform the method including:

transmitting, to the first data owner of the segmentation request after determining the de-identified set of user identifiers, the de-identified set of user identifiers of each user determined to qualify for the segment.

6. The non-transitory computer-readable storage medium of claim 4, wherein the program instructions are further computer-executable to implement:

transmitting, to the first data owner of the segmentation request after determining the de-identified set of user identifiers, the de-identified set of user identifiers of each user determined to qualify for the segment.

* * * * *